(12) United States Patent
Kang et al.

(10) Patent No.: US 11,374,782 B2
(45) Date of Patent: Jun. 28, 2022

(54) METHOD AND APPARATUS FOR CONTROLLING ELECTRONIC DEVICE

(71) Applicant: Samsung Electronics Co., Ltd., Suwon-si (KR)

(72) Inventors: Jae-Eun Kang, Suwon-si (KR); Kyung-Jae Kim, Suwon-si (KR); Yang-Wook Kim, Hwaseong-si (KR); Chang-Hyun Lee, Suwon-si (KR); Jae-Ho Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 16/061,197

(22) PCT Filed: Dec. 23, 2016

(86) PCT No.: PCT/KR2016/015170
§ 371 (c)(1),
(2) Date: Jun. 11, 2018

(87) PCT Pub. No.: WO2017/111532
PCT Pub. Date: Jun. 29, 2017

(65) Prior Publication Data
US 2018/0367330 A1    Dec. 20, 2018

(30) Foreign Application Priority Data
Dec. 23, 2015    (KR) .................. 10-2015-0185337

(51) Int. Cl.
*H04L 12/28*    (2006.01)
*H04L 29/08*    (2006.01)
(Continued)

(52) U.S. Cl.
CPC .......... *H04L 12/282* (2013.01); *G06F 3/0482* (2013.01); *G06F 3/04847* (2013.01);
(Continued)

(58) Field of Classification Search
CPC ............... H04L 12/282; H04L 12/2827; H04L 12/2829; H04L 29/08; H04L 67/125;
(Continued)

(56) References Cited

U.S. PATENT DOCUMENTS

2010/0105364 A1* 4/2010 Yang ................. H04M 1/72445
455/414.1
2012/0110747 A1    5/2012 Yum et al.
(Continued)

FOREIGN PATENT DOCUMENTS

CN    101729656 A    6/2010
JP    2004-180260 A   6/2004
(Continued)

OTHER PUBLICATIONS

European Search Report dated Oct. 23, 2019; European Appln. No. 16 879 399.0-1213.
(Continued)

*Primary Examiner* — Tadesse Hailu
*Assistant Examiner* — Darrin Hope
(74) *Attorney, Agent, or Firm* — Jefferson IP Law, LLP

(57) ABSTRACT

The present disclosure relates to a technology for a sensor network, machine to machine (M2M), machine type communication (MTC), and Internet of things (TOT). The present disclosure can be utilized for intelligent services (smart home, smart building, smart city, smart car or connected car, healthcare, digital education, retail, security and safety related services, etc.) on the basis of the above technology. The present disclosure provides a method and apparatus for controlling operations of electronic devices. According to the present disclosure, a method for controlling electronic devices by a control device comprises the steps of: collecting, by the control device, sensing information through at least one sensor; determining, by the control device, a user's (Continued)

situation on the basis of the collected sensing information; displaying at least one candidate control mode among a plurality of pre-stored control modes on the basis of the result of the determination; receiving a selection input for selecting one control mode from the at least one displayed candidate control mode; and transmitting a control command for at least one electronic device which can be controlled in the one control mode, in response to the selection input.

12 Claims, 16 Drawing Sheets

(51) Int. Cl.

| | | |
|---|---|---|
| *G06F 3/0482* | (2013.01) | |
| *G06F 3/0484* | (2022.01) | |
| *H04L 67/125* | (2022.01) | |
| *H04L 65/40* | (2022.01) | |
| *H04W 4/70* | (2018.01) | |
| *G06F 3/04847* | (2022.01) | |
| *H04W 4/80* | (2018.01) | |

(52) U.S. Cl.
CPC ...... *H04L 12/2827* (2013.01); *H04L 12/2829* (2013.01); *H04L 29/08* (2013.01); *H04L 67/125* (2013.01); *H04W 4/70* (2018.02); *H04W 4/80* (2018.02)

(58) Field of Classification Search
CPC ......... H04W 4/70; H04W 4/80; G06F 3/0482; G06F 3/04847
USPC ....................................................... 715/735
See application file for complete search history.

(56) References Cited

U.S. PATENT DOCUMENTS

| | | | |
|---|---|---|---|
| 2013/0086700 A1* | 4/2013 | Cho | G06F 21/6218 726/36 |
| 2014/0244001 A1 | 8/2014 | Glickfield et al. | |
| 2015/0066158 A1 | 3/2015 | Kim et al. | |
| 2015/0067528 A1* | 3/2015 | Yoshida | G06F 3/0484 715/740 |
| 2015/0082225 A1 | 3/2015 | Shearer | |
| 2015/0104037 A1 | 4/2015 | Lee et al. | |
| 2015/0140990 A1 | 5/2015 | Kim et al. | |
| 2015/0153057 A1 | 6/2015 | Matsuoka et al. | |
| 2015/0185713 A1 | 7/2015 | Glickfield et al. | |
| 2015/0264439 A1 | 9/2015 | Karlin et al. | |
| 2015/0351681 A1* | 12/2015 | Lee | A61B 5/7282 600/595 |
| 2017/0097743 A1* | 4/2017 | Hameed | G06F 9/445 |
| 2018/0069721 A1 | 3/2018 | Ha | |

FOREIGN PATENT DOCUMENTS

| | | |
|---|---|---|
| JP | 2012-100068 A | 5/2012 |
| KR | 10-2010-0122030 A | 11/2010 |
| KR | 10-2015-0028191 A | 3/2015 |
| KR | 10-2015-0041974 A | 4/2015 |

OTHER PUBLICATIONS

Japanese Office Action dated Feb. 2, 2021, issued in Japanese Application No. 2018-532583.
Chinese Office Action dated Mar. 11, 2021, issued in Chinese Office Application No. 201680075898.6.
Japanese Office Action dated Sep. 28, 2021, issued in Japanese Patent Application No. 2018-532583.

* cited by examiner

| SENSING INFORMATION BASE | | | USER SITUATION | CANDIDATE CONTROL MODE |
|---|---|---|---|---|
| LOCATION | TIME | ACTION | | |
| BED IN ROOM | MORNING | WAKE-UP | FIRST SITUATION | MORNING COFFEE MODE |
| | | | | TV WATCHING MODE |
| | | | | WASH MODE |
| | | | | SLEEP MODE |
| | | | | ROOM SERVICE MODE |
| SOFA IN ROOM | NIGHT | RETURN HOME | SECOND SITUATION | SLEEP MODE |
| | | | | ENTERTAINMENT MODE |
| | | | | SHOWER MODE |

FIG.6

| SLEEP MODE CONTROL DEVICE SET | | CURRENT STATE | SLEEP MODEL CONTROL VALUE | WHETHER SELECTION/ CONTROL ARE REQUIRED | |
|---|---|---|---|---|---|
| HOTEL TV | | OFF | OFF | | |
| TEMPERATURE CONTROLLER | | 23 °C | 25 °C | ○ | MANUAL |
| LAMP | LIVING ROOM LAMP | ON | OFF | ○ | AUTOMATIC |
| | BED ROOM LAMP | ON | OFF | ○ | AUTOMATIC |
| | BED-SIDE LAMP | ON | ON | | |
| CURTAINS/BLINDS | | OPEN | CLOSE | ○ | AUTOMATIC |
| DOOR LOCK | | CLOSE | CLOSE | | |
| WINDOW | | OPEN | CLOSE | ○ | AUTOMATIC |
| ALARM (CLOCK) | | NOT SET-UP | SET-UP | ○ | MANUAL |
| AIR CLEANER | | OFF | OFF | | |
| HUMIDIFIER | | OFF | ON | ○ | MANUAL |

FIG.7

METHOD AND APPARATUS FOR CONTROLLING ELECTRONIC DEVICE

CROSS-REFERENCE TO RELATED APPLICATION(S)

This application is a National Phase Entry of PCT International Application No. PCT/KR2016/015170, which was filed on Dec. 23, 2016 and claims priority under 35 U.S.C. § 119 of Korean Patent Application No. 10-2015-0185337, filed on Dec. 23, 2015, in the Korean Intellectual Property Office the disclosure of which is incorporated herein by reference in its entirety.

TECHNICAL FIELD

The present disclosure relates to a method and a device for controlling operations of electronic devices connected through a network.

BACKGROUND ART

The Internet is evolving from a human-oriented connection network in which humans generate and consume information, to an Internet of Things (IoT) network in which distributed elements, such as objects and the like, exchange and process information. An Internet of Everything (IoE) technology may be an example of an IoT technology combined with a big data processing technology through connection with a cloud server or the like.

In order to implement the IoT, technical factors such as a sensing technique, wired/wireless communication, network infrastructure, service interface technology, and security technology are required, and thus technologies such as a sensor network, Machine to Machine (M2M) communication, Machine Type Communication (MTC), and the like for a connection between objects are recently being researched.

In an IoT environment, through collection and analysis of data generated in connected objects, an intelligent Internet Technology (IT) service to create a new value for peoples' lives may be provided. The IoT may be applied to fields, such as smart homes, smart buildings, smart cities, smart cars, connected cars, smart grids, health care, smart home appliances, or high-tech medical services, through the convergence of the conventional Information Technology (IT) and various industries.

A smart system configuring a smart home, a smart building or a smart hotel means a system for connecting various electronic devices in a predetermined space through a wired or wireless network to control operations of the electronic devices and enable communication between the electronic devices. Such a smart system integrates electronic devices through a gateway (GW) and uses a control device to be connected to a short-range wireless network or an external public data network, for example, an Internet Protocol (IP) network (that is, Internet), thereby providing a wider variety of services connected with the Internet.

As the types of electronic devices become more diverse and user demands for the devices become more diverse, studies are underway to further improve user convenience by accommodating various user demands.

In particular, due to the nature of a hotel, room users are changed in a short period of time. Therefore, although various electronic devices are provided in a room, a user has difficulty in knowing how to use electronic devices in a short time. In addition, the utilization method may be conveyed to a guest as a user by a hotel employee, a separate guidance system, or the like, but in this case, additional personnel expenses may be incurred due to an additional work burden on the hotel employee and additional costs may be incurred to provide the guidance system, so that customer satisfaction may be deteriorated by such troublesome procedures. In addition, since a user is required to control each of a plurality of devices even if the user knows how to use the devices, the user is required to perform inconvenient procedures several times.

Further, research is underway to group and control a plurality of electronic devices by a smart system, and a previously proposed group control method for electronic devices uses a scheme in which a user sets in advance a situation for group control of electronic devices and controls the electronic devices to perform a desired operation by selecting one of the electronic devices corresponding to the set situation one by one.

For example, assuming that there are four situations which are required to be set in group control by a user such as going home, going out, sleeping, and watching movies, and the number of electronic devices connected to a smart system is 30, the user is required to perform setting operations of the electronic devices up to 4*30=120 times for group control. Therefore, the greater the number of electronic devices to be controlled and situations to be set increase, the more a conventional group control method increases the inconvenience of a user and increases the complexity of a user interface for group control.

In the case of a hotel, a situation for group control is set according to a decision of a hotel manager, and thus the set situation may not correspond to the tastes and intentions of a guest who is a room user. In this case, the guest feels uncomfortable and feels cumbersome to reset the situation for controlling electronic devices.

With the development of smart devices and systems in the future, the number of electronic devices controlled by a smart system in a house, a hotel room, or a building office is expected to be further increased, and a situation required to be set is expected to be also increased. Accordingly, it is required to provide an improved control scheme which can grasp intentions of a user at the time of group control of electronic devices to recommend devices to be controlled according to a user's situation, reduce the complexity of device control, and improve the user convenience.

DETAILED DESCRIPTION OF THE INVENTION

Technical Problem

The present disclosure provides a method and a device for efficiently controlling a plurality of electronic devices by grasping a user's situation.

In addition, the present disclosure provides a method and a device for controlling a plurality of devices by efficiently grouping the devices.

Further, the present disclosure provides a method and a device for providing a user interface improved for controlling electronic devices.

Technical Solution

A method according to an embodiment of the present disclosure relates to a method for controlling electronic devices by a control device, the method including: collecting, by the control device, sensing information through at least one sensor; determining, by the control device, a user's situation on the basis of the collected sensing information; displaying at least one candidate control mode among a plurality of pre-stored control modes, on the basis of a result of the determination; receiving a selection input relating to one control mode among the at least one displayed candidate control mode; and transmitting a control command for at least one electronic device which can be controlled in the one control mode, in response to the selection input.

A device according to an embodiment of the present disclosure relates to a control device for controlling an electronic device, the device including: a communication unit, which is configured to collect sensing information through at least one sensor and includes at least one communication module for performing communication with the electronic device; an input/output unit configured to provide a user interface for controlling an operation of the electronic device; a storage unit configured to store a plurality of control modes; and a control unit configured to control operations of determining a user's situation on the basis of the collected sensing information, displaying at least one candidate control mode among the plurality of stored control modes, on the basis of a result of the determination, receiving a selection input relating to one control mode among the at least one displayed candidate control mode, and transmitting a control command for at least one electronic device which can be controlled in the one control mode, in response to the selection input.

BRIEF DESCRIPTION OF DRAWINGS

The above and other aspects, features and advantages of the present disclosure will be more apparent from the following detailed description taken in conjunction with the accompanying drawings, in which:

FIG. 6 illustrates an example of a candidate control mode according to an embodiment of the present disclosure;

FIG. 7 illustrates an example of detailed set values of electronic devices according to a sleep mode among control modes according to an embodiment of the present disclosure;

MODE FOR CARRYING OUT THE INVENTION

Hereinafter, embodiments of the present disclosure will be described in detail with reference to the accompanying drawings. In the following description, it should be noted that only portions required for comprehension of operations according to the embodiments of the present disclosure will be described and descriptions of other portions will be omitted not to make subject matters of the present disclosure obscure. The terms which will be described below are terms defined in consideration of the functions in embodiments of the present disclosure, and may vary depending on users, intentions of operators, or customs. Therefore, the definitions of the terms should be made based on the contents throughout the specification.

Figure 1:
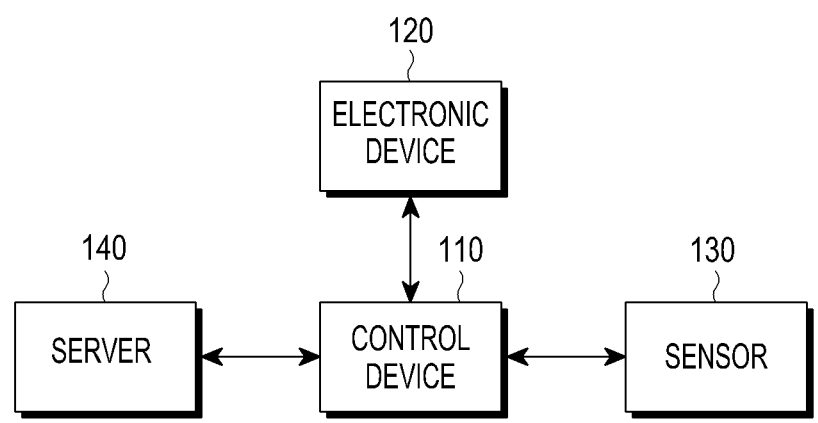
FIG. 1 is a block diagram illustrating a configuration of a smart system according to a first embodiment of the present disclosure.

FIG. 1 is a block diagram illustrating a configuration of a smart system according to a first embodiment of the present disclosure. In the present specification, the smart system collectively refers to a system for controlling electronic devices connected through a network in a predetermined space such as a smart home, a smart building, and a smart hotel.

Referring to FIG. 1, the smart system may include a control device 110, an electronic device 120, a sensor 130, and a server 140.

The control device 110 may refer to a device configured to use sensing information received from the sensor 130 to determine a current situation of a user, including the state of electronic devices 120, the surrounding environment information, the state of the user, and the like, and control the electronic devices 120. In addition, the control device 110 may include a device configured to receive information for controlling an electronic device from the server 140. In addition, the control device 110 may provide a user interface for controlling an electronic device, and the user interface may be provided in various forms such as a sound effect, a voice message, a text message, an icon display, and an animation. The control device 110 may perform communication by being connected to all electronic devices 120 and sensors 130 located in a room, and a server 140 located inside or outside the room. Accordingly, the control device 110 may transmit or receive information to or from other devices, and may transmit a signal for controlling other devices. The control device 110 may include a gateway for controlling an electronic device in a room. Alternatively, the control device 110 may be a user terminal or a remote controller, or may be located in a room, as a separate device such as a TV. In the case of a hotel, the control device may be a terminal which is provided to a guest who checks in to a hotel during the stay, or may be a terminal which is provided during service hours when the guest uses facilities in a building. The user terminal may be, for example, a personal digital assistant (PDA) having a communication function, a smart phone, a mobile phone, a tablet PC, a notebook computer, or the like. In addition, the user terminal may be a wearable device such as a smart watch. In FIG. 1, the control device 110 includes a gateway. In the case where the control device 110 is a user terminal, a program or an application for controlling an operation of an electronic device 120 may be installed in the user terminal.

The electronic device 120 may include all types of electronic devices located in a house, an office, or a room, such as smart appliances, security devices, lighting devices, and energy devices. For example, a smart appliance may be a TV, a refrigerator, a washing machine, a vacuum/robot cleaner, a digital video disc (DVD) player, an audio, an air conditioner, an oven, a washer, a dryer, an air cleaner, a set-top box, a TV box (e.g. Samsung HomeSync™, Apple TV™, or Google TV™), a gaming console, an electronic dictionary, a camcorder, an electronic photo frame, a lighting device, an alarm clock, an electric pot, an electric shower, electric blinds, electric curtains, or the like. A security device may be a door lock, a security camera, a security sensor, or the like, a lighting device may be a fluorescent lamp, a light emitting diode (LED) lighting device, or the like, and an energy device may be a power meter, an electric outlet, a multi-tap, an air conditioning controller, a power socket, or the like. In the case of a hotel, the control device 110 may make a service request such as Do Not Disturb, Make Up Room, a fixture request, and a room service in addition to controlling electronic devices. According to various embodiments of the present disclosure, an electronic device may be a combination of devices as described above. Further, it will be apparent to a person skilled in the art that electronic devices according to embodiments of the present disclosure are not limited to devices as described above.

The plurality of electronic devices 120 may receive a control command from the control device 110 and operate according to the control command.

The sensors 130 may refer to a device which provides information for controlling the electronic devices 120. The sensors 130 may include all types of sensors located in a house, an office, or a room, such as a water surface sensor, an illumination sensor, a temperature sensor, a humidity sensor, a sound sensor, a motion sensor, a proximity sensor, a door sensor, and a biosensor. Some of the sensors 130 may be provided in the control device 110 or the electronic devices 120. A sensor 130 may perform a sensing operation according to a predetermined time or a predetermined period, and may transmit, to the control device 110, sensing information periodically or at a requested time. The sensing information may be used to determine a current situation of a user, including the state of the electronic devices 120, the surrounding environment information, and the state of the user, and the like. Further, although not shown, the sensing information from the sensor 130 may be directly transmitted to the server 140 rather than to the control device 110.

The server 140 may be a device which provides information for electronic device control, which is required for the control device 110 to control the electronic devices 120. In the case of a hotel, the server may be a hotel management server, in the case of a home network, the server may be a home server, and in the case of a building, the server may be a building management server included in a building management system (BMS). The server 140 may provide, to the control device 110, a list of electronic devices 120 according to a room level, a control mode list, an electronic device list for each control mode as information for controlling the electronic devices 120 by the control device 110. The room level may be a room type such as a standard room, a deluxe room, or a suite room, and provided electronic devices 120 and provided control modes may be different depending on the room type. In addition, the server may store user profile information which can be used to display at least one candidate control mode selected according to an order of the probabilities of modes to be selected by a user from the highest probability to the lowest probability, among a plurality of control modes pre-configured by the control device 110, and provide the user profile information to the control device 110.

Figure 2:
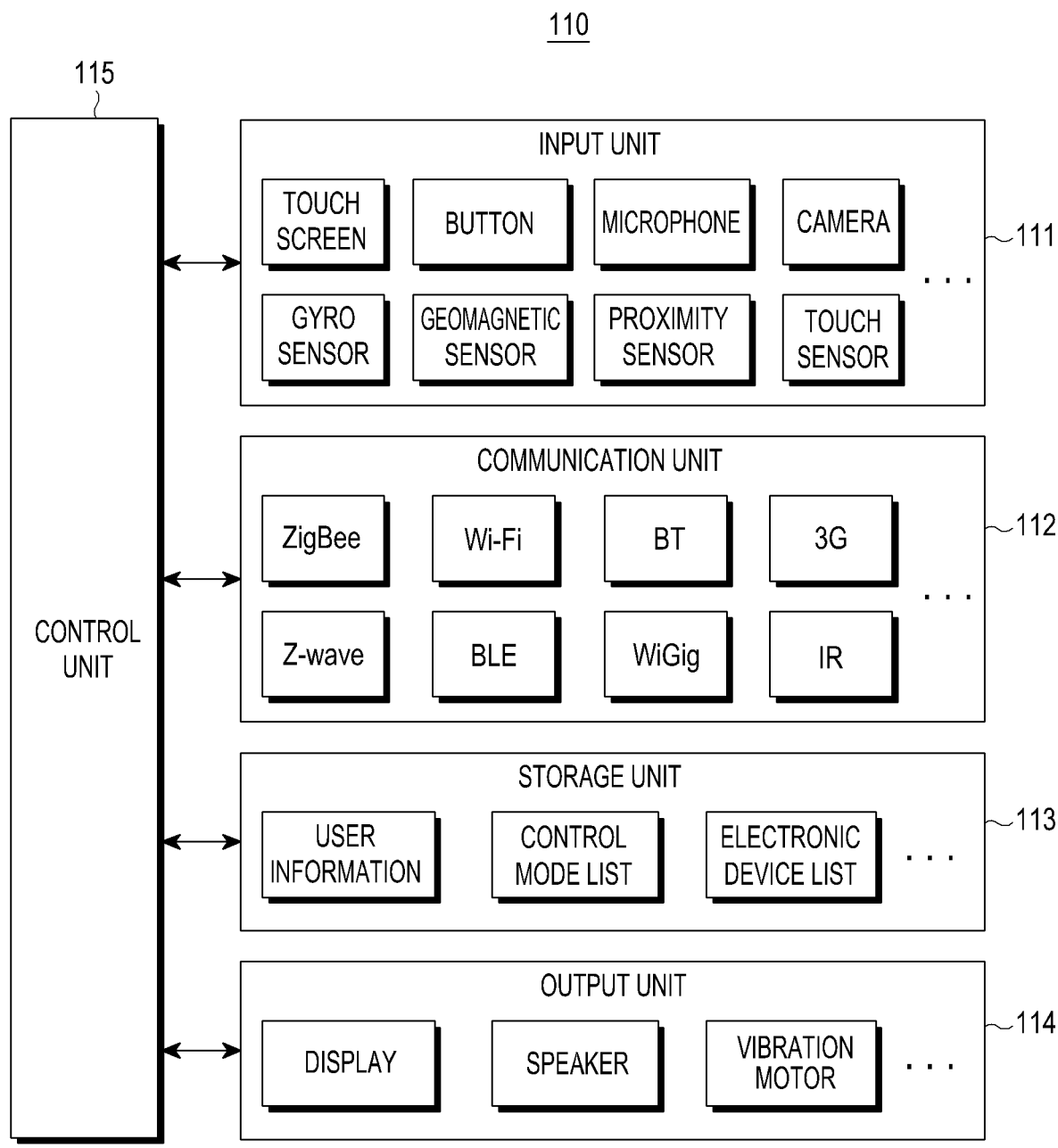
FIG. 2 illustrates a detailed configuration of a control device according to a first embodiment of the present disclosure.

FIG. 2 illustrates a detailed configuration of a control device 110 according to a first embodiment of the present disclosure.

Referring to FIG. 2, the control device 110 may include an input unit 111, a communication unit 112, a storage unit 113, an output unit 114, and a control unit 115. The input unit 111 may receive, from a user, an input of a command for selecting a control mode or a command for controlling an electronic device 120, and include a touch screen, a button, a microphone, a camera, a gyro sensor, a geomagnetic sensor, a proximity sensor, a touch sensor, or the like. The communication unit 112 may include communication modules for communicating with devices in a smart system, that is, an electronic device 120, a sensor 130, and a server 140. The communication module may include various wireless or wired communication protocol based modules such as a ZigBee module, a wireless LAN module such as Wi-Fi, a Bluetooth module, a 3G communication module, a Z-wave module, a Bluetooth low energy (BLE) module, a WiGig module, an infrared (IR) module, and the like. The communication unit 112 receives sensing information collected by the sensor, user profile information stored in the server, or the like or transmits a control command for the electronic device 120. The storage unit 113 may store information for controlling the electronic device 120, and the information for controlling the electronic device 120 may include user information, a control mode list, an electronic device list, and the like. The user information may be information received from the server 140 or user profile information including gender, age, nationality, hobby, and the like, as information pre-stored in the control device 110. In the case of a hotel, the user profile information may be stored in a hotel server and may further include travel purpose, information on the number of companions and the companions, an airplane schedule, a hotel service used during the previous stay, a device control history, and the like. The electronic device list includes all electronic devices which can be controlled by the control device 120 in a room. The control mode list indicates modes pre-stored by a system administrator or the like, based on location of a user and a current state of the user, and electronic devices which can be controlled for each mode may pre-configured. The control modes may include, for example, a morning coffee mode, a TV watching mode, a wash mode, a sleep mode, a room service mode, an entertainment mode, a shower mode, and the like. Electronic devices which can be controlled for each mode may be different, and some of the electronic devices may overlap. In addition, in the case where the control device 110 is a user terminal, an application for controlling an electronic device may be installed and stored in the storage unit 113. The output unit 114 provides information to a user for controlling the electronic device 120, and may include a display, a speaker, a vibration motor, and the like. The control unit 115 may include a CPU, a ROM in which a control program for controlling an electronic device 120 is stored, and a RAM which temporarily stores a signal or data input from the outside, or is used as a storage area for a task performed by the control device 110, and the control unit controls other components in the control device 110.

Figure 3:
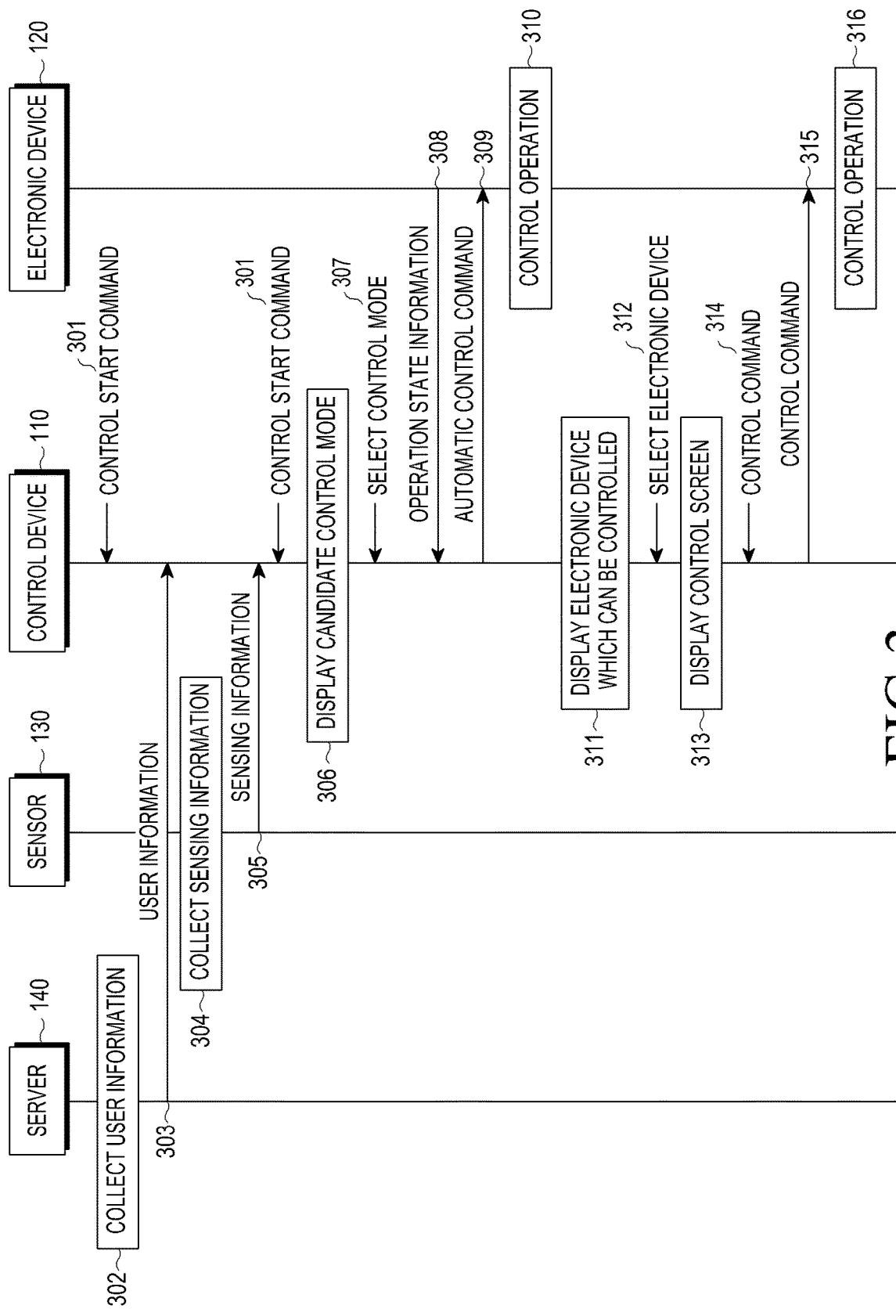
FIG. 3 is a flowchart illustrating a method for controlling an electronic device according to a control mode by a smart system according to a first embodiment of the present disclosure.

FIG. 3 is a flowchart illustrating a method for controlling an electronic device according to a control mode by a smart system according to a first embodiment of the present disclosure.

Referring to FIG. 3, when the control device receives a command to start a control operation according to an input from a user through an input unit of the control device 110 (operation 301), the server 140 collects user information through room reservation and check-in (operation 302) or transmits pre-stored user information to the control device 110 (operation 303). In addition, the sensor 130 in a room collects sensing information according to a predetermined time and a predetermined period (operation 304), and transmits the collected sensing information to the control device 110 (operation 305). In another embodiment, the control device 110 may receive a command to start a control operation according to an input from a user through the input unit in a state in which the control device has received user information and sensing information from the server 140 and the sensor 130. Thereafter, the control device 110 determines location and a current state of the user by using the information collected from the server 140 and the sensor 130, and displays candidate control modes indicating some control modes which are selected according to a predetermined rule, among a plurality of pre-configured control modes, based on the determined location and current state of the user (operation 306). In addition, at the time of selecting a candidate control mode, the control device 110 may additionally consider environmental information such as date, day of the week, time zone, temperature, humidity, and the amount of sunshine, which is collected through the Internet. In the case where the control device 110 is a user terminal, the control device may additionally consider user information stored in the user terminal or a control mode list, an electronic device list, and the like. Electronic devices which can be controlled according to control modes, respectively, and a set value for each control mode of each of the electronic devices may be changed by a system manager or a user who operates the control device 110, or may be configured to be automatically changed according to a use history of the user.

For example, when a user enters a hotel room, a door sensor senses that a door lock is opened, and a motion sensor installed in the room grasps a user's location. When the current time is a late time to go to sleep, and a user checks in at a hotel as soon as the user has arrived at a local area by using an airplane, the control device 110 may determine that the user will take a shower, turn on a TV, or go to sleep, according to a predetermined rule, and accordingly, the control device 110 may display, on an output unit, a shower mode, a music listening mode, a TV watching mode, and a sleep mode as a candidate control mode.

For another example, when a user goes to sleep, gets up in the morning, and then starts moving, the motion sensor detects motion of the user, and the control device 110 may display, on the output unit, a shower mode, a music listening mode, a TV watching mode, a morning coffee mode, a room service mode, and the like, as a candidate control mode, which correspond to actions the user is expected to take, based on sensing information of the motion sensor and a history of user's usual actions in the morning.

When a user selects one control mode among candidate control modes through the input unit of the control device 110 (operation 307), the control device 110 receives current operation state information from the electronic device 120 (operation 308), and displays, on the output unit, a list of electronic devices which can be controlled in the selected control mode according to a predetermined scenario, based on the received operation state information (operation 311). For example, when a user selects a sleep mode, the control device 110 may display the sleep mode on a display unit so that a temperature controller, a lamp, a TV, an audio, a window, a door lock, an alarm clock, a curtain/blind, and the like can be controlled, respectively.

In addition, according to an embodiment of the present disclosure, a control value may be pre-configured so as to enable automatic control of some electronic devices according to a predetermined scenario for each control mode. When a user selects a corresponding control mode (operation 307), the control device 110 may transmit, to a corresponding electronic device 120, an automatic control command for controlling electronic devices, which have a configured control value different from that of the current operation state, among some of the electronic devices, having fixed control values configured therein (operation 309). Then, corresponding electronic devices 120 may perform a control operation according to the received control command (operation 310). The control command may be different depending on the characteristics of each of the electronic devices, and the control command may be a command for controlling a corresponding electronic device to be turned on/off, or may be a command for controlling a set value (level) of the electronic device. Although operation 309 and operation 310 occur before operation 311 in FIG. 3, operation 309 and operation 310 may occur simultaneously with operation 311 or may occur after operation 311. In addition, the control value may be configured based on user information or a device control history according to a configuration condition such as a user's situation, time, day of the week, or room.

When some of the electronic devices 120 which can be manually controlled according to a predetermined scenario for each control mode are selected to be controlled (operation 312), the control device 110 displays a control screen for controlling the selected electronic devices 120 on the display unit (operation 313). When a control command for the electronic device 120 which can be manually controlled is input by a user (operation 314), the control device 110 may transmit the input control command to a corresponding electronic device 120 (operation 315), and the electronic device 120 may perform a control operation according to the received control command (operation 316).

Optionally, operation 308 may be omitted. That is, when a user selects one control mode among candidate control modes (operation 307), electronic devices related to the corresponding control mode may directly perform a control operation according to the corresponding control mode (operation 310).

A first embodiment of the present disclosure described above corresponds to a case where a separate gateway is not included or a case where a gateway function is included in the control device. However, according to a second embodiment of the present disclosure, a gateway may be separately configured.

Figure 4:
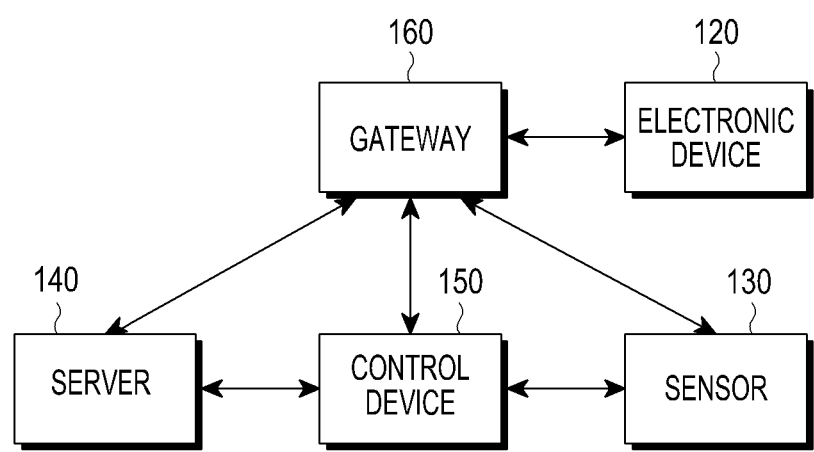
FIG. 4 is a block diagram illustrating a configuration of a smart system according to a second embodiment of the present disclosure.

FIG. 4 is a block diagram illustrating a configuration of a smart system according to a second embodiment of the present disclosure.

Referring to FIG. 4, as compared with the smart system according to the first embodiment, a control device 150 of a smart system according to a second embodiment does not include a function of a gateway for controlling an electronic device 120. Therefore, a gateway 160 is separately provided. The electronic device 120, a sensor 130, and a server 140 are the same as those of the smart system according to the first embodiment, and thus the duplicated description thereof will be omitted.

The control device 150 is a device for providing a user interface for controlling an electronic device according to a control mode, and an actual control operation is performed by the gateway 160.

The gate way 160 may refer to a device for determining the state of electronic devices 120 by using sensing information received from the sensor 130, and controlling the electronic devices 120. The gateway 160 may perform communication by being connected to all electronic devices 120, sensors 130, and servers 140 which are located in a room. Accordingly, the gateway 160 may transmit or receive information to or from other devices, and may transmit a signal for controlling other devices.

Although not shown, a separately configured gateway may include a communication unit, a storage unit, and a control unit, and the functions thereof are similar to those of the communication unit, the storage unit, and the control unit which are described in FIG. 2.

Figure 5A:
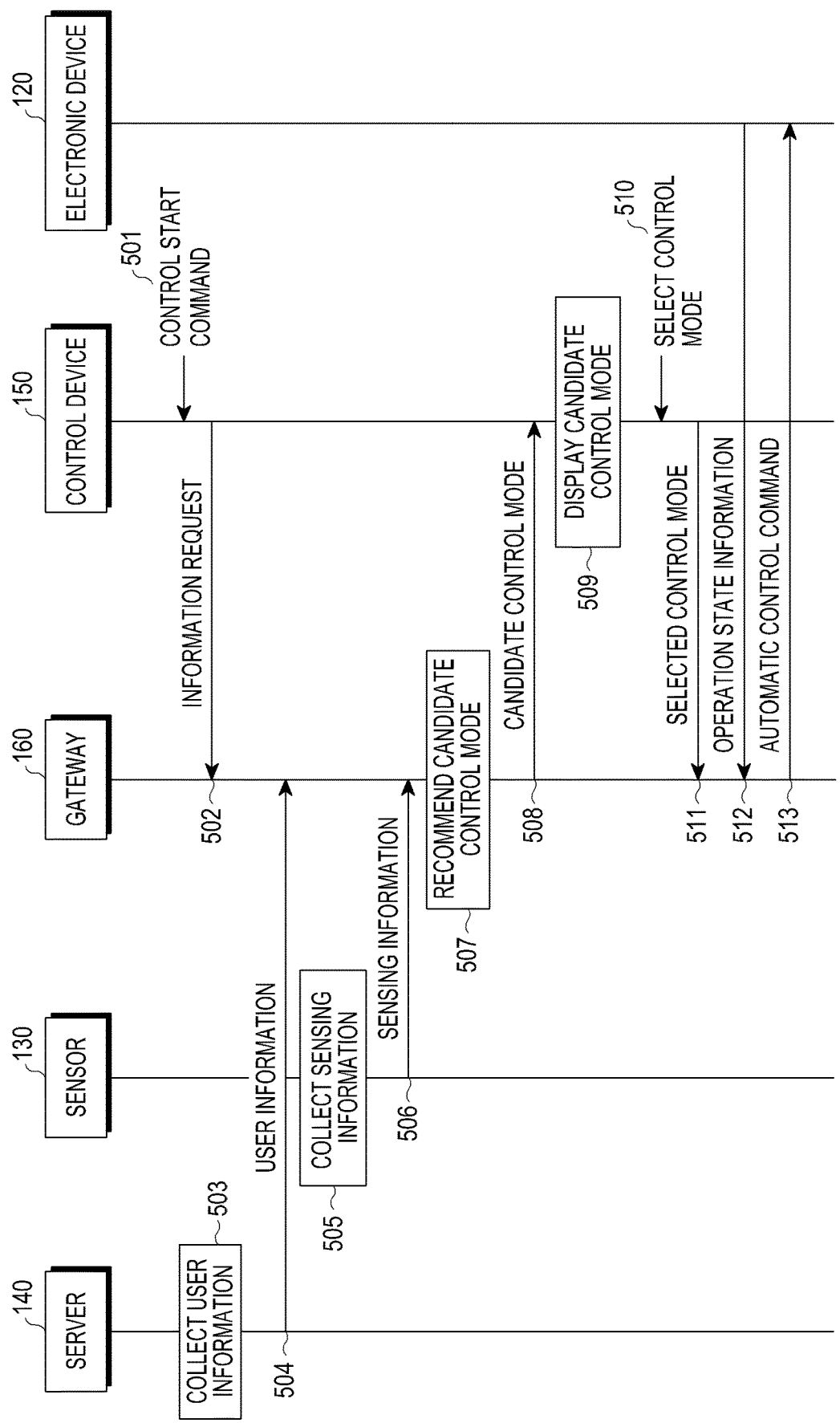
FIG. 5 is a flowchart illustrating a method for controlling an electronic device according to a control mode by a smart system according to a second embodiment of the present disclosure.
Figure 5B:
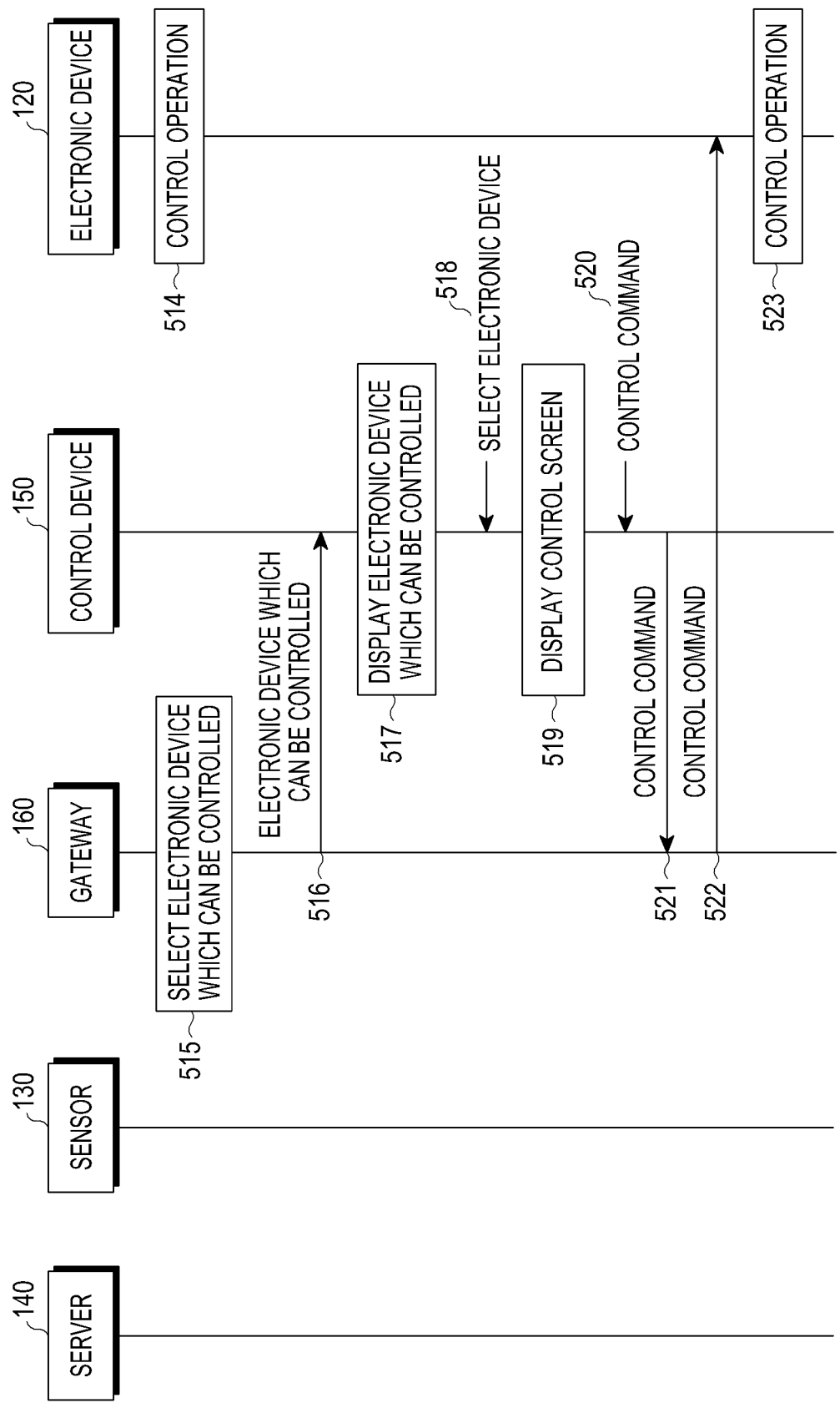

FIG. 5 is a flowchart illustrating a method for controlling an electronic device according to a control mode by a smart system according to a second embodiment of the present disclosure. FIGS. 5A and 5B are similar to the first embodiment shown and described in FIG. 3, but the control device 150 processes input from a user (operations 501, 510, 518, and 520), output (operations 509, 517, and 519) and information transmission and reception (operations 502, 508, 511, 516, and 521), and the gateway 160 uses information collected (operations 504 and 506) from the server 140 or the sensor 130 to perform candidate control mode recommendation (operation 507) and control operations (operations 511 to 522) according to a selected control mode.

FIG. 6 illustrates an example of a candidate control mode according to an embodiment of the present disclosure.

In the embodiment of FIG. 6, location, time, and action are determined based on sensing information, two types of user situations are exemplified according to a combination of the sensing information, and candidate control modes are classified for each user situation. That is, a situation in which a user is located in a bed in a room in the morning and a user's waking-up motion is detected may be set as a first situation, and a candidate control mode in the first situation may be set to a morning coffee mode, a TV watching mode, a wash mode, a sleep mode, or a room service mode. In addition, a situation in which a user is located on a sofa in a room in the nighttime and a door sensor detects that the user has returned to the room may be set as a second situation, and a candidate control mode in the second situation may be set to a sleep mode, an entertainment mode, or a shower mode.

FIG. 7 illustrates an example of detailed set values of electronic devices according to a sleep mode among control modes according to an embodiment of the present disclosure.

An embodiment of FIG. 7 indicates a current operation state and a control value pre-configured with respect to a sleep mode, for each of electronic devices which can be controlled in the sleep mode, information on other electronic devices, each of which has a configured control value different from that of a current operation state and is thus required to be controlled, and a control method for the electronic devices. The control method for the electronic devices may be configured automatically or manually, and the control method may be predetermined according to the characteristics of the electronic devices, or may be changed depending on a user control history. As the sleep mode is selected, a control command is automatically transmitted to electronic devices (a living room lamp, a bedroom lamp, curtains/blinds, and a window), each of which has a configured value different from that of a current operation state, among electronic devices for which control methods are automatically configured. In addition, since a manual control is required for electronic devices (a temperature controller, an alarm (clock), and a humidifier) each of which has a configured value different from that of a current operation state, among electronic devices for which control methods are manually configured, a user interface may be provided to allow a user to control the devices through a user terminal or a control device.

Next, a method for controlling an electronic device by a smart system according to a third embodiment of the present disclosure will be described. In the third embodiment of the present disclosure, the electronic device is controlled using a user terminal as a control device in a smart system in a hotel.

The user terminal is registered as the control device in the smart system in the hotel at the time of check-in, so that the user terminal may operate as a control device for controlling electronic devices. The user terminal may be a personal terminal currently possessed by a user, or may be a public terminal provided to the user by a hotel at the time of check-in. When a personal terminal currently possessed by a user is used as the control device, information required for controlling an electronic device, among user information stored in the user terminal, may be selected and configured to be shared with the smart system in the hotel. When the hotel provides a public terminal, user profile information stored in a server of the smart system in the hotel may be stored in the public terminal at the time of check-in. The server stores and manages all data for managing the hotel, and is connected to various facilities in the hotel, that is, is connected to electronic devices located in a room, a lobby, a restaurant, and a fitness center, and gateways for controlling the electronic devices through a network.

Figure 8:
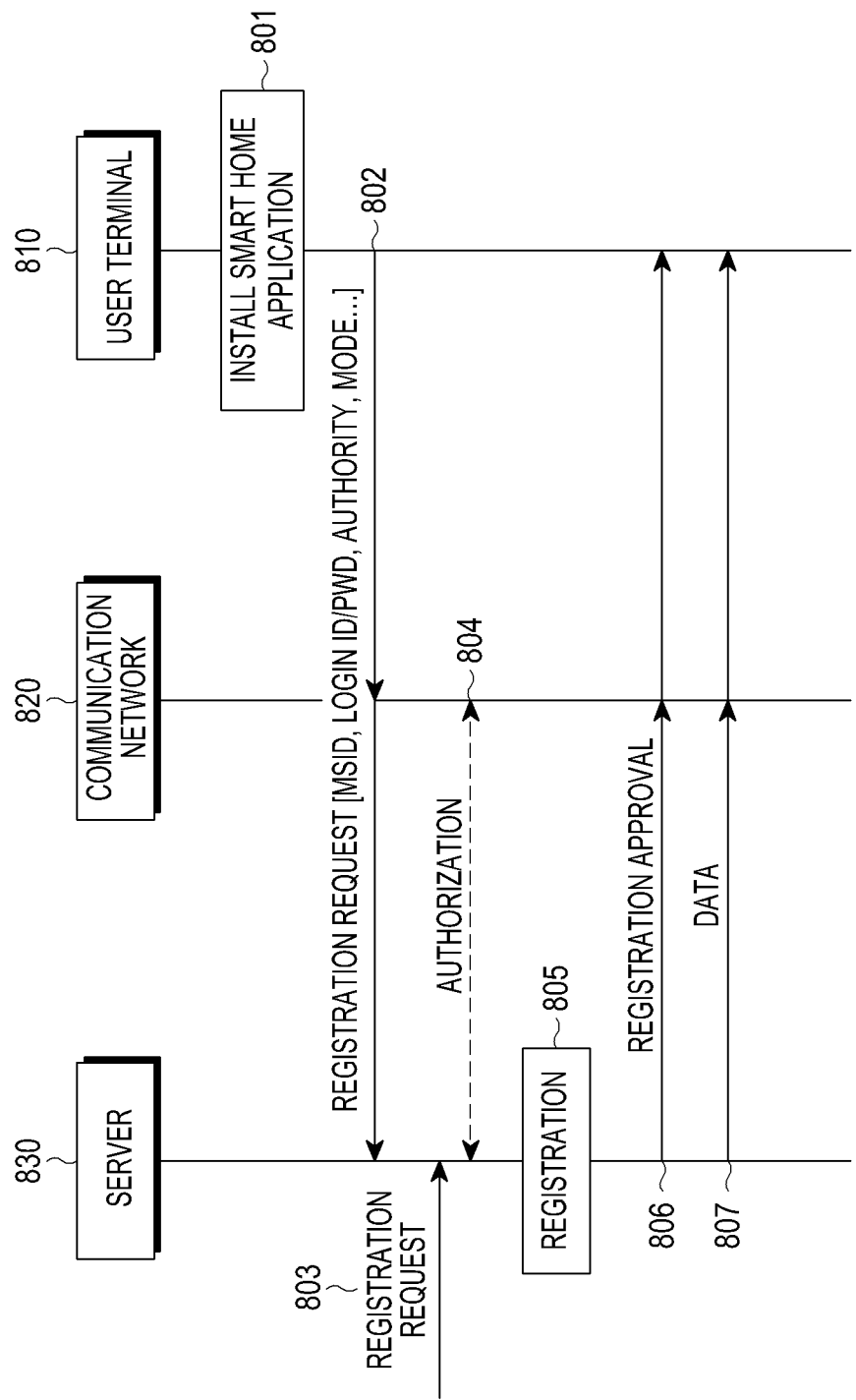
FIG. 8 illustrates a procedure for registering a user terminal in a smart system for a control operation according to a third embodiment of the present disclosure.

FIG. 8 illustrates a procedure for registering a user terminal in a smart system for a control operation according to a third embodiment of the present disclosure. For example, in the case of a guest who is a user staying at a hotel, the procedure may be a procedure for registering a user terminal in a hotel smart system.

Referring to FIG. 8, a user terminal 810 installs an application for controlling electronic devices in a room and a hotel at the time of check-in (operation 801). As an alternative embodiment, the application may be restricted to be installed only in the user terminal 810 authorized through check-in. For example, the server provides an authorization number for approving installation of an application to the user terminal 810 that has completed the check-in process, and a hotel server or an external server for providing an application allows only the user terminal 810 authorized through the authorization number to download the application.

As an alternative embodiment, the application may provide limited functions depending on an allowed authority level of the user terminal 810. For example, an application may selectively provide functions for inquiring information through a server 830, receiving alarm information from the server 830, and controlling electronic devices which can be controlled in a hotel, depending on the allowed authority level. The allowed authority level may be configured through the server 830 or the external server for providing the application. In addition, in the case of a hotel, according to the level of a room used by a guest, the available hotel service is differentiated, the facilities provided in the room are different, and the available facilities in the hotel are different. Accordingly, differentiated control functions may be provided for each user.

The user terminal 810 executes the application and transmits a registration request message to the server 1030 through the application (operation 802). The registration request message includes at least one of an identifier (for example, an MS identifier (MSID) or an International Mobile Subscriber Identity (IMSI)), a login ID and a password, authority information, and operation mode information of the user terminal 810.

As an alternative embodiment, the server 830 receives a registration request for the user terminal 810 to be registered through its own user interface (operation 803), and registers the user terminal 810 (operation 805). In addition, as an alternative embodiment, the server 830 may authorize the user terminal 810, by using identification information obtained from the user terminal 810 or, in the case of a smart phone, by accessing a communication server which manages subscriber information of a corresponding mobile communication system from a user (operation 804). The server 830 may generate authority information of the user terminal 810 according to the authority result. Thereafter, the server 830 stores information on the user terminal 830 and manages the information by means of the registered user terminal 810 (operation 805). Further, the server 830 transmits, to the user terminal 810, a registration approval message indicating that the information on the user terminal 810 is successfully registered (operation 806). Thereafter, the server 830 may transmit a variety of information for controlling electronic devices to the user terminal 810 (operation 807). The information for control may include user profile information stored in the server 830, a control mode list, an electronic device list for each control mode, and a control value and a control method for each of electronic devices for each control mode. In addition, the information for control may also include control information with respect to various facilities in the hotel. The user terminal 810 that has completed the processes of FIG. 8 may then operate as a control device for controlling electronic devices in the hotel. That is, when a user enters a room, the user terminal 810 may control electronic devices in the room according to the control operations of FIG. 3.

Meanwhile, in the case where the user who has completed the user terminal registration process through the processes of FIG. 8 moves to a space in the hotel other than the room, when an application in the user terminal is executed by the user, the user terminal may select hotel facilities around the user according to a predetermined rule to display the same on the user terminal, based on information received from the server through the registration process of the user terminal and location information of the terminal.

Thereafter, when one facility of facility lists displayed on the user terminal is selected by the user terminal, the user terminal may display a control list which can be controlled by the user terminal with respect to the selected facility on the user terminal. When a restaurant is selected by a user, the user terminal may display a reservation service, menu information, price information, and the like of the selected restaurant. When the restaurant reservation service is selected by the user, the user terminal may receive an input of information required for restaurant reservation and transmit the information to the restaurant. In addition, an operation of receiving an input of a piece of the reservation information may be omitted using user information pre- stored in the user terminal. In addition, when a fitness club is selected by the user, the user terminal may display a fitness club use method, exercise equipment-specific reservability, and the like. In addition, when the user selects a room or the user enters the room, the same control processes as those of the smart system described above may be performed.

Figure 9:
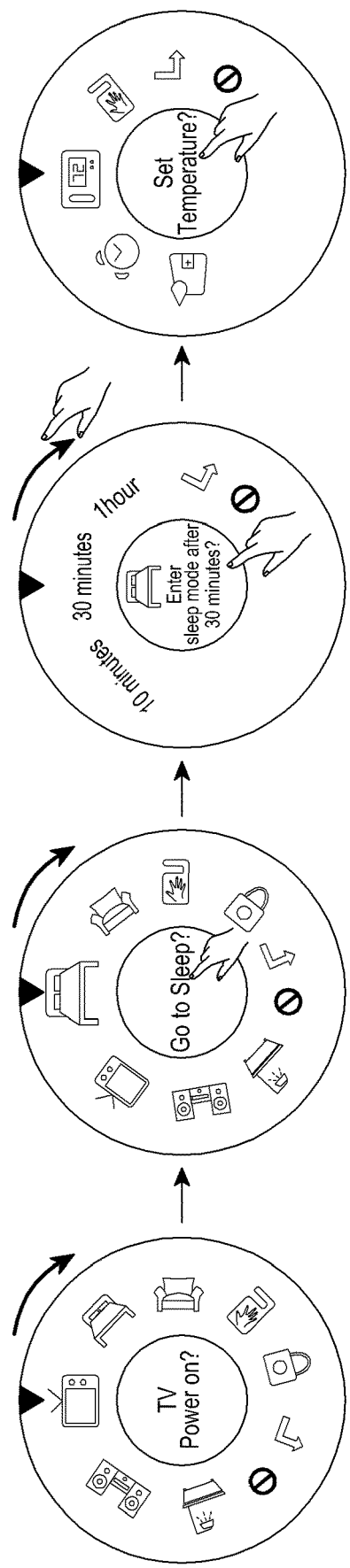
FIG. 9 illustrates an example of a user interface screen of a control device according to an embodiment of the present disclosure.

FIG. 9 illustrates an example of a user interface screen of a control device according to an embodiment of the present disclosure, and illustrates an example of a user interface screen which displays a candidate control mode. In FIG. 9, candidate control modes selected according to a predetermined user situation, among a plurality of pre-configured control modes, are circularly arranged, in particular, a control mode having the highest probability of modes to be selected by a user may be arranged to be located on the central axis of a circular button, control modes having the next highest probability of selection may be arranged to be located near the center axis of the circular button. The modes having a high probability of being selected may be prioritized based on user profile information. For convenience of a user, the size or color of an image indicating a control mode located on the current central axis may be displayed in the center of the circular button to be distinguished from the other images, and guiding words for controlling the control mode located on the current central axis may be displayed as a text in the center of the circular button. The user may move positions where control modes are displayed through click and rotary (The click may be an input scheme used for icon selection and control input, and the rotary may be an input scheme used to move the position of an icon through rotation or to adjust a configuration/control level. For example, a temperature may be raised or lowered by a temperature controller through the rotary and then is configured to the adjusted temperature through the click), touch, hovering, gesture, etc., and further, guiding words to be displayed in the center of the circular button may be changed according to the position-changed control mode. When the user selects one control mode displayed on the circular button, the screen may be switched to a screen for more precisely controlling the selected control mode. In addition, when a control mode or a device is selected by the user, the control device may vibrate or allow a LED provided in the control device to emit light by informing the user of the selected control mode or device.

In FIG. 9, for example, in a situation in which the current time is a late time to go to sleep, a user checks in at a hotel as soon as the user has arrived at a local area by using an airplane, and then enters a room and sits on a sofa, the control device according to according to an embodiment of the present disclosure may recommend a shower mode, a music listening mode, a TV watching mode, a sleep mode, a rest mode, a Do Not Disturb mode, a door lock locking mode, etc., as candidate control modes. When the user rotates the control device to select the sleep mode among the candidate control modes, the control device displays a screen for configuring a sleep mode entry time, and the user may rotate the control device to configure the control device to enter the sleep mode after 30 minutes. When the sleep mode entry reservation configuration has been completed, the control device may display devices which can be controlled in the sleep mode on a screen thereof, and when the user selects a temperature controller, the control device may display a detailed screen for configuring a desired temperature in the room.

Figure 10:
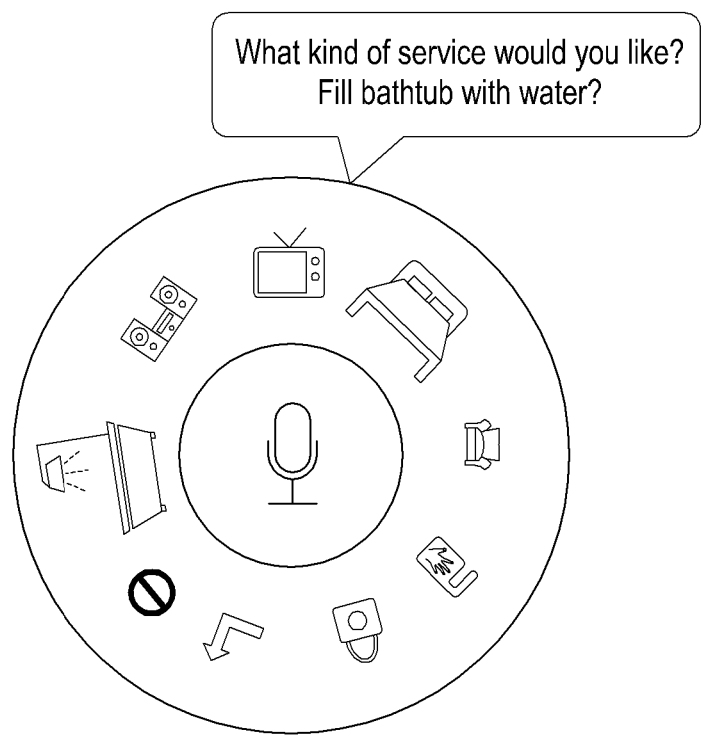
FIG. 10 illustrates an example of a user interface screen of a control device according to another embodiment of the present disclosure.

FIG. 10 illustrates an example of a user interface screen of a control device according to another embodiment of the present disclosure, and illustrates an example of a user interface for supporting voice guidance. In FIG. 9, the circular button is displayed in a rotatable form. However, in FIG. 10, candidate control modes selected according to a predetermined rule among a plurality of pre-configured control modes are circularly arranged on the circular button, in particular, the size or color of an image indicating a control mode having the highest probability of modes to be selected by a user is displayed to be distinguished from the other images. In addition, voice guidance for the control mode having the highest probability of modes to be selected may be output before a user's selection. As shown in FIG. 9, guiding words may be displayed on the screen with voice guidance. When a user touches and selects one control mode displayed on the circular button by using a finger, the screen may be switched to a screen for more precisely controlling the selected control mode, and the corresponding voice guidance may be output.

Figure 11:
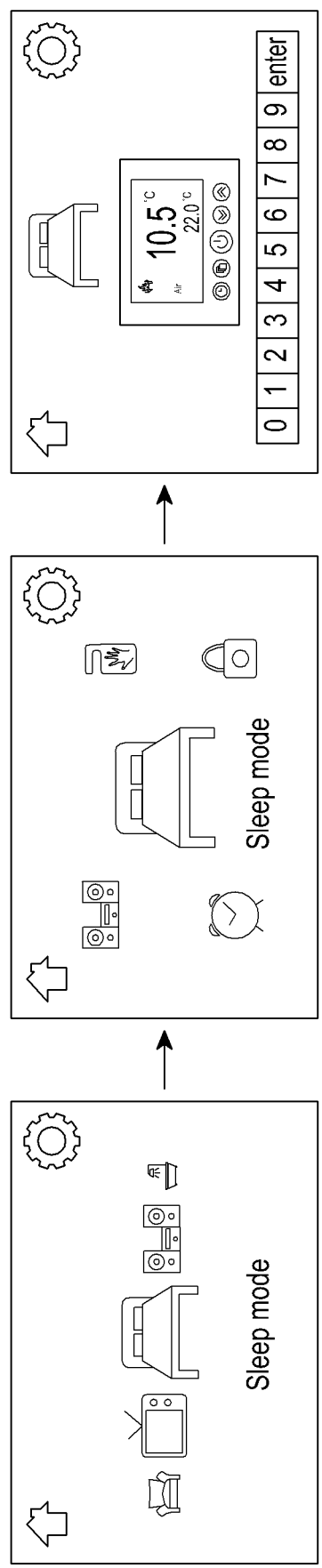
FIG. 11 illustrates another example of a user interface screen of a control device according to an embodiment of the present disclosure.

FIG. 11 illustrates another example of a user interface screen of a control device according to an embodiment of the present disclosure. In FIG. 11, candidate control modes selected according to a predetermined user situation among a plurality of pre-configured control modes are arranged in a line, in particular, a control mode having the highest probability of modes to be selected by a user may be located at the center of the screen, and control modes having the next highest probability of selection may be arranged on both sides in order. In addition, for convenience of a user, the size or color of an image indicating a control mode located at the center of the screen may be displayed to be distinguished from the other images, and an icon may be displayed to become smaller as the icon moves away from the center of the screen. In addition, guidance words for controlling the control mode located at the center of the screen may be displayed as a text in the top or the bottom of the screen, or may be output as a voice through a speaker. A user may move icons to the left or the right using finger touch, and accordingly, the control mode located at the center of the screen may be changed and the guidance words may be changed according to the changed control mode. When the user touches and selects one control mode among control modes displayed on the screen by using a finger, the screen may be switched to a screen for more precisely controlling the selected control mode. FIG. 11 illustrates an example of a case where a sleep mode is selected. When the sleep mode is selected, the screen is switched to a screen in which electronic devices which can be controlled in the sleep mode are arranged, and when one electronic device is selected among the electronic devices, the screen is switched to a screen for controlling the selected electronic device. In FIG. 11, a temperature controller is selected, and a numeric keypad for inputting a temperature configuration value may be displayed at the bottom of the screen.

In FIGS. 9 to 11, the control device is shown in a circular shape and a quadrilateral shape, but the present disclosure is not limited thereto, and may be implemented in various shapes such as a triangle, a pentagon, a hexagon, an octagon, a star shape, and a diamond shape. FIGS. 9 to 11 illustrate an example of a case where a screen is switched through finger touch. However, the present disclosure is not limited thereto, and various input schemes may be applied. In addition, each control mode may be displayed, on a screen, using a tab menu as well as an icon.

FIGS. 12A to 12E illustrate various examples of an interface in a case where a control device according to an embodiment of the present disclosure is implemented in a circular shape.

Figure 12A:
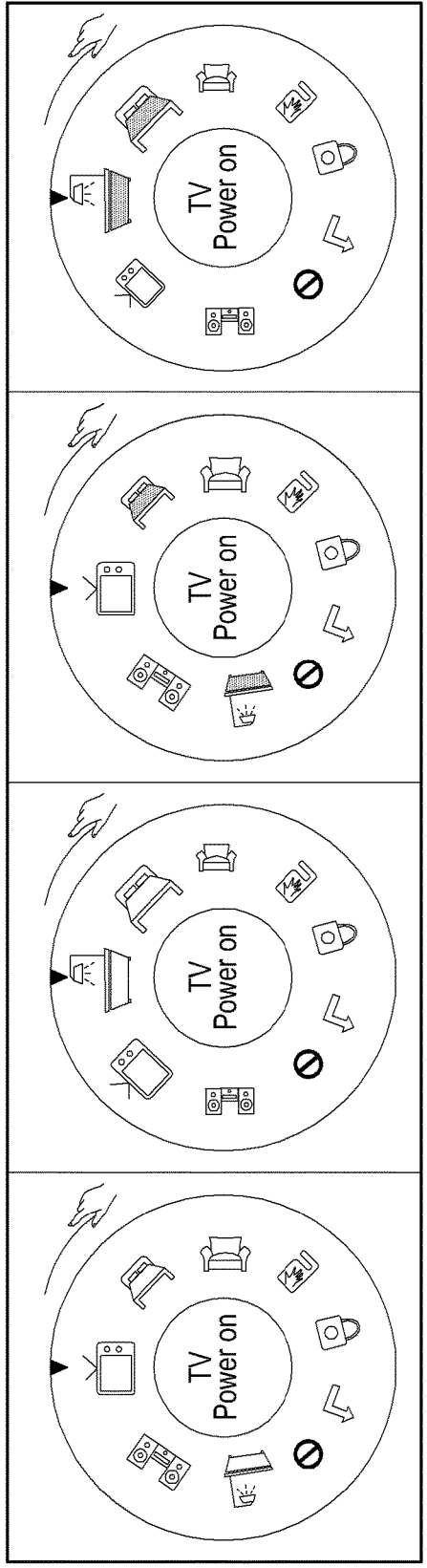
FIGS. 12A to 12E illustrate various examples of an interface in a case where a control device according to an embodiment of the present disclosure is implemented in a circular shape.
Figure 12B:
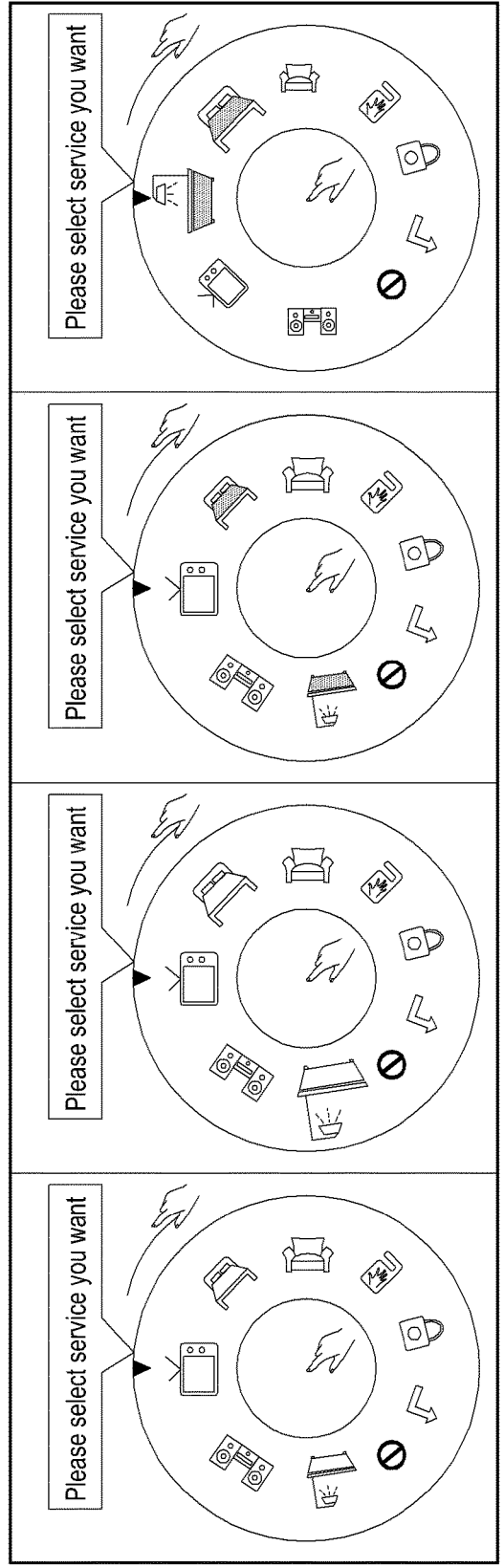
Figure 12C:
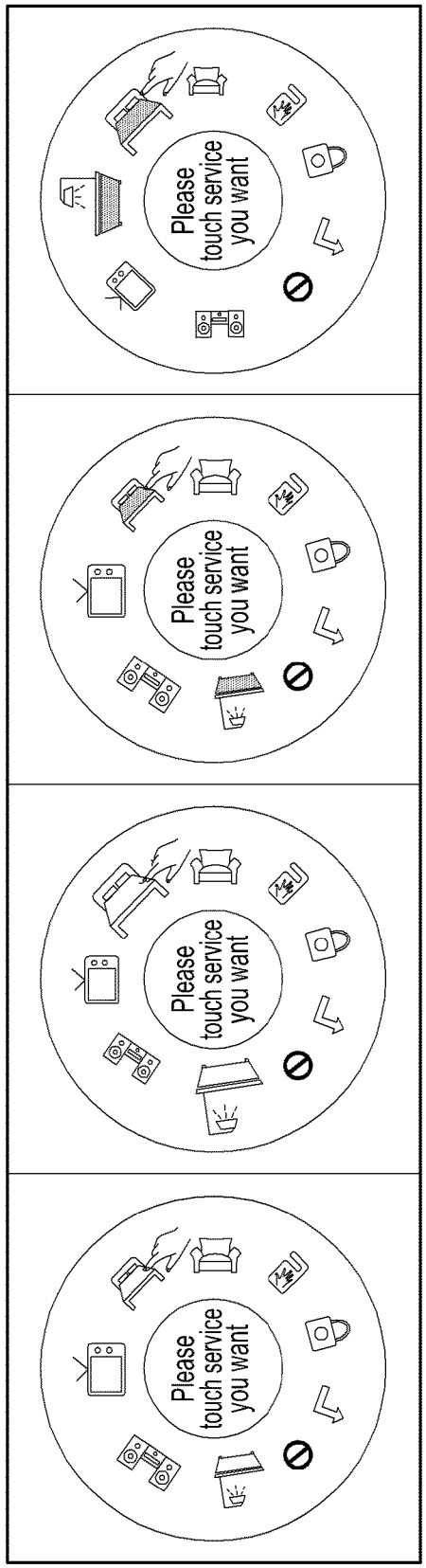
Figure 12D:
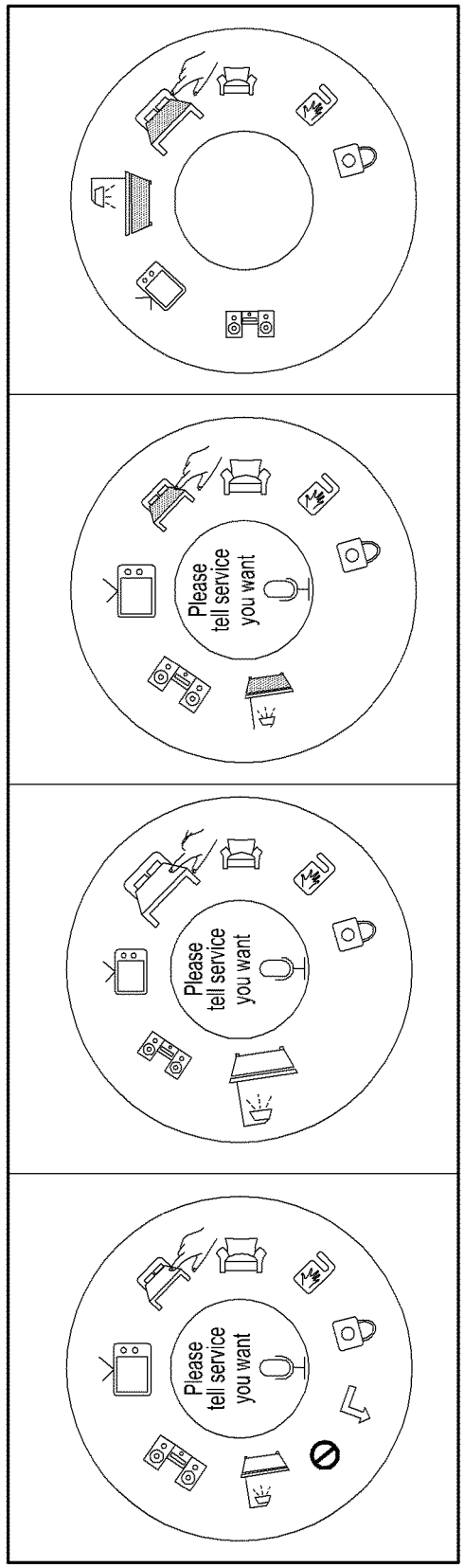
Figure 12E:
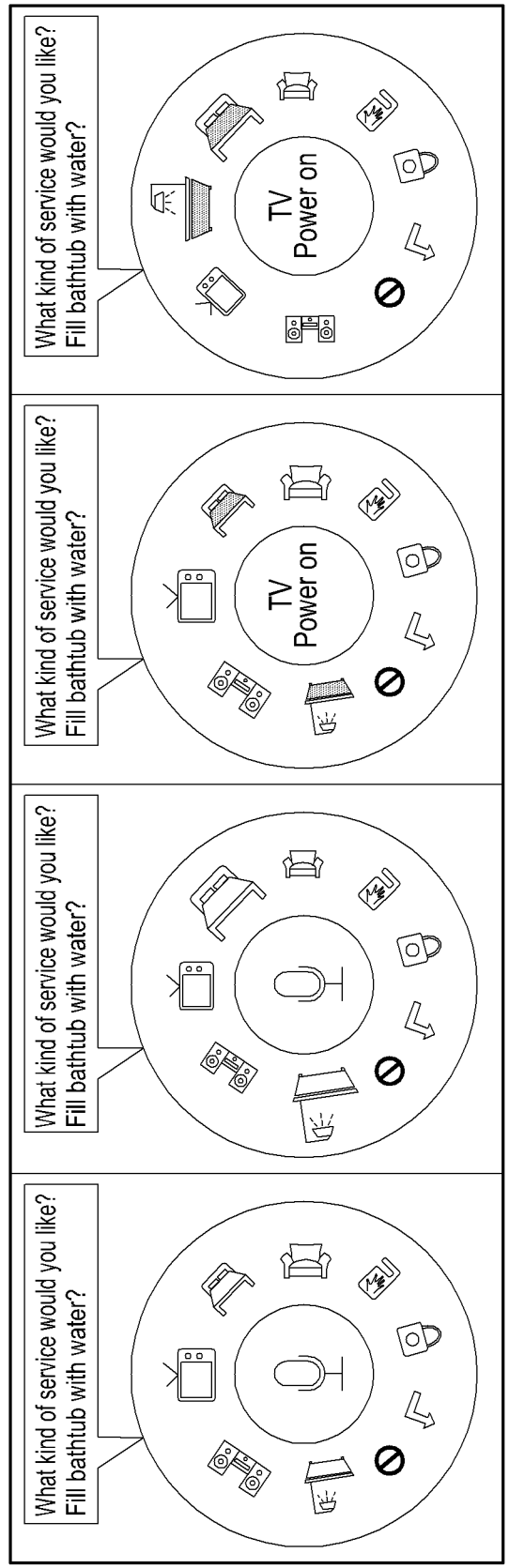

FIG. 12A illustrates an example in which a user input is input through button click and rotary and displays a text for a selected control mode in a central circular area of a control device. FIG. 12B illustrates an example in which a user input is input through button click and rotary and a guidance voice for helping the user input is output. FIG. 12C illustrates an example in which an user input is input as a voice through a microphone and a text for a selected control mode is displayed in a central circular area. FIG. 12D illustrates an example in which a user input is input as a voice through a microphone and a guidance voice for helping the user input is output. In each of the cases of FIGS. 12A to 12D, icons for each control mode are displayed in the same size and color, the icons are displayed in different sizes and the same colors, the icons are displayed in the same sizes and different colors, or icons are displayed in different sizes and colors. In addition, when the icons for each control mode are displayed in black and white, the contrast may be displayed differently for each icon instead of displaying different colors.

Figure 13:
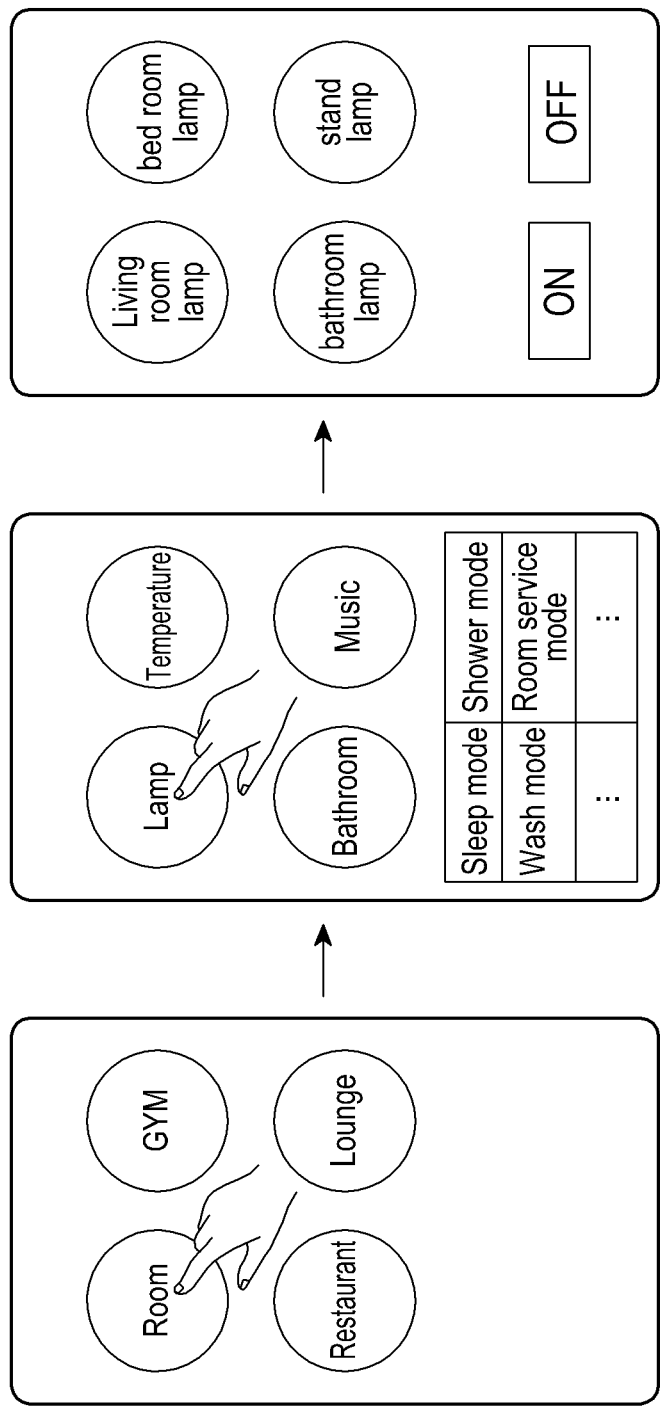
FIG. 13 illustrates an example of a user interface screen of a control device according to an embodiment of the present disclosure.

FIG. 13 illustrates an example of a user interface screen of a control device according to the another embodiment of the present disclosure, and illustrates a user interface screen to be displayed on a user terminal after a user checks in at a hotel using the user terminal according to a third embodiment of the present disclosure. As shown in FIG. 8, in the check-in process, a user terminal is registered in a smart system in a hotel, and accordingly, the user terminal may operate as a control device for controlling electronic devices. When the user terminal having completed the check-in executes an application for device control, a user interface as shown in the first diagram of FIG. 13 may be displayed. When a user desires to configure devices in a room in advance before arriving at the room, the user may touch and select "Room" among Room, GYM, Restaurant, and Lounge displayed on a screen. Then, as shown in the second diagram, a plurality of recommendation control modes may be displayed at the bottom of the screen, and when the user selects one of the modes, devices which can be controlled according to the selected control mode may be displayed at the top of the screen. When the user selects "lamp", lamps which can be controlled in the room may be displayed as shown in the right diagram, and images for on/off control may be displayed at the bottom of the screen. In addition, when the user goes to exercise, goes to eat, or visits a lounge, the user touches a corresponding image and then perform appropriate controls for each location. In addition, a location receiving device of the user terminal may track the location of the user in the hotel, and may display images of places near the place where the user is currently located on a user interface screen to help user's selection.

FIGS. 9 to 13 illustrate an example of a user interface for device control according to an embodiment of the present disclosure. However, the user interface according to an embodiment of the present disclosure is not limited thereto, and it will be apparent to a person skilled in the art that the user interface may be modified and implemented in various forms. Particular aspects of the present disclosure may be implemented as a computer-readable code in a computer-readable recording medium.

It will be understood that a method and a device according to an embodiment of the present disclosure may be implemented in the form of hardware, software, or a combination of hardware and software. Such software may be stored, for example, in a volatile or nonvolatile storage device, or a storage medium which is readable by a machine (e.g., a computer) while being optically or magnetically recordable. It will be appreciated that a method according to an embodiment of the present disclosure may be implemented by a computer or a mobile terminal including a control unit and a memory, and the memory is an example of a storage medium which is readable by using a program including instructions for implementing embodiments of the present disclosure or a device suitable for storing programs.

Although the specific embodiments have been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method for controlling an electronic device by a control device, the method comprising:
   collecting, by the control device, sensing information from at least one sensor;
   identifying, by the control device, user related information based on the collected sensing information;
   identifying at least one candidate control mode corresponding to the user related information, from among a plurality of pre-stored control modes, wherein each control mode comprises pre-configured control values for a plurality of electronic devices corresponding to the control mode;
   displaying, by the control device, the at least one candidate control mode including information for each of the plurality of electronic devices which can be controlled in the at least one candidate control mode, the at least one candidate control mode being displayed according to an order of probability of the candidate control mode being selected by a user out of the plurality of pre-stored control modes, the probability being determined based on the user related information;
   receiving a selection input by using a circular button which is rotatable to select one control mode among the at least one displayed candidate control mode; and
   transmitting a control command for at least one electronic device which can be controlled in the one control mode, in response to the selection input,
   wherein the at least one candidate control mode having a highest probability is arranged to be located at a center of the displayed at least one candidate control mode and at least one other candidate control mode of the plurality of pre-stored control modes is displayed at a periphery of a user interface of the control device in the circular button.

2. The method of claim 1, further comprising
   receiving, by the control device, at least one of user profile information or information for controlling the electronic device from a server,
   wherein the user related information is identified based on the at least one of the user profile information, the information for controlling the electronic device and the collected sensing information.

3. The method of claim 2, wherein the information for controlling the electronic device includes at least one of an electronic device list, a control mode list, or a control value for each of the plurality of electronic devices which can be controlled in each of the plurality of pre-stored control modes.

4. The method of claim 1, further comprising:
   after the transmitting of the control command receiving operation state information of the plurality of electronic devices from the plurality of electronic devices; and
   transmitting the control command for each of the plurality of electronic devices corresponding to the one control mode, based on the received operation state information of the electronic device.

5. The method of claim 1, further comprising,
   after the transmitting of the control command for the at least one electronic device which can be controlled in the one control mode, in response to the selection input, transmitting an automatic control command for at least one electronic device which can be automatically controlled in the one control mode.

6. The method of claim 5, wherein the transmitting of the control command for the at least one electronic device which can be controlled in the one control mode, in response to the selection input, comprises transmitting a control command for remaining electronic devices except for the at least one electronic device which can be automatically controlled, among the at least one electronic device which can be controlled in the one control mode.

7. A control device for controlling an electronic device, the control device comprising:
   a communication circuitry, which is configured to collect sensing information from at least one sensor and includes at least one transceiver for performing communication with the electronic device;
   an input/output circuitry configured to provide a user interface for controlling an operation of the electronic device;
   a storage configured to store a plurality of control modes, wherein each control mode comprises pre-configured control values for a plurality of electronic devices corresponding to the control mode; and
   at least one processor configured to control operations of:
      identifying user related information based on the collected sensing information,
      identifying at least one candidate control mode corresponding to the user related information, from among the plurality of control modes,
      displaying at least one candidate control mode including information for each of electronic devices which can be controlled in the at least one candidate control mode, the at least one candidate control mode being displayed according to an order of probability of the candidate control mode being selected by a user out of the plurality of control modes, the probability being determined based on the user related information,
      receiving a selection input by using a circular button which is rotatable to select one control mode among the at least one displayed candidate control mode, and
      transmitting a control command for at least one electronic device which can be controlled in the one control mode, in response to the selection input,
   wherein the at least one candidate control mode having a highest probability is arranged to be located at a center of the displayed at least one candidate control mode and at least one other candidate control mode of the plurality of stored control modes is displayed at a periphery of a user interface of the control device in the circular button.

8. The device of claim 7, wherein the at least one processor is further configured to control operations of receiving at least one of user profile information or information for controlling the electronic device from a server, and identifying the at least one of the user profile information or the information for controlling the electronic device and the collected sensing information.

9. The device of claim 8, wherein the information for controlling the electronic device includes at least one of an electronic device list, a control mode list, or a control value for each of electronic devices which can be controlled in each of the plurality of stored control modes.

10. The device of claim 7, wherein the at least one processor is further configured to control operations of receiving operation state information of the plurality of electronic devices from the plurality of electronic devices, and transmitting a control command for at least one electronic device which can be controlled in the one control mode, based on the received operation state information of the electronic device.

11. The device of claim 7, wherein the at least one processor is further configured to control an operation of transmitting an automatic control command for at least one electronic device which can be automatically controlled in the one control mode, after transmitting the control command for the at least one electronic device which can be controlled in the one control mode, in response to the selection input.

12. The device of claim 11, wherein, when the at least one processor transmits the control command for the at least one electronic device which can be controlled in the one control mode, in response to the selection input, the at least one processor is further configured to control transmission of a control command for remaining electronic devices except for the at least one electronic device which can be automatically controlled, among the at least one electronic device which can be controlled in the one control mode.

* * * * *